United States Patent
Majumdar et al.

(10) Patent No.: US 8,301,032 B2
(45) Date of Patent: Oct. 30, 2012

(54) WIDE FIELD-OF-VIEW AMPLIFIED FIBER-RETRO FOR SECURE HIGH DATA RATE COMMUNICATIONS AND REMOTE DATA TRANSFER

(76) Inventors: Arun Kumar Majumdar, Agoura Hills, CA (US); Thomas Maurice Shay, Albuquerque, NM (US)

(*) Notice: Subject to any disclaimer, the term of this patent is extended or adjusted under 35 U.S.C. 154(b) by 1068 days.

(21) Appl. No.: 12/069,646

(22) Filed: Feb. 12, 2008

(65) Prior Publication Data
US 2009/0202254 A1 Aug. 13, 2009

(51) Int. Cl.
*H04B 10/00* (2006.01)

(52) U.S. Cl. ......... 398/170; 398/169; 398/129; 398/131

(58) Field of Classification Search .......... 398/118–131, 398/169, 170
See application file for complete search history.

(56) References Cited

U.S. PATENT DOCUMENTS

| | | | |
|---|---|---|---|
| 3,989,942 A * | 11/1976 | Waddoups | 398/170 |
| 4,064,434 A | 12/1977 | Waksberg | |
| 4,081,669 A * | 3/1978 | Klingman, III | 356/139.04 |
| 4,096,380 A * | 6/1978 | Eichweber | 398/125 |
| 4,134,008 A * | 1/1979 | de Corlieu et al. | 398/170 |
| 4,189,233 A * | 2/1980 | Hurt et al. | 356/4.02 |
| 4,209,689 A | 6/1980 | Linford et al. | |
| 4,223,216 A * | 9/1980 | Quick et al. | 250/226 |
| 4,334,152 A * | 6/1982 | Dakin et al. | 250/226 |
| 4,361,911 A * | 11/1982 | Buser et al. | 398/171 |
| 4,731,879 A * | 3/1988 | Sepp et al. | 398/170 |
| 4,798,437 A * | 1/1989 | Rediker et al. | 385/3 |
| 4,887,310 A * | 12/1989 | Meyzonnette et al. | 398/170 |
| 5,114,227 A * | 5/1992 | Cleveland, Jr. | 356/139.05 |
| 5,142,400 A * | 8/1992 | Solinsky | 398/129 |
| 5,229,593 A * | 7/1993 | Cato | 250/205 |
| 5,274,379 A * | 12/1993 | Carbonneau et al. | 342/45 |
| 5,390,040 A * | 2/1995 | Mayeux | 398/129 |
| 5,422,645 A * | 6/1995 | Nettleton et al. | 342/45 |
| 5,434,668 A * | 7/1995 | Wootton et al. | 356/450 |
| 5,459,470 A * | 10/1995 | Wootton et al. | 342/45 |
| 5,552,920 A * | 9/1996 | Glynn | 398/126 |
| 5,822,099 A * | 10/1998 | Takamatsu | 398/162 |
| 5,870,216 A * | 2/1999 | Brock et al. | 398/49 |
| 5,966,227 A * | 10/1999 | Dubois et al. | 398/169 |
| 6,002,818 A * | 12/1999 | Fatehi et al. | 385/17 |
| 6,154,299 A * | 11/2000 | Gilbreath et al. | 398/170 |

(Continued)

OTHER PUBLICATIONS

Charles M. Swenson et al, "Low Power FLC-based Retro-modulator Communications System," Proc. SPIE, vol. 2990, pp. 296-310, 1997.

(Continued)

*Primary Examiner* — Agustin Bello

(57) ABSTRACT

An optical system for remotely optical communications at a high data rate between a base station and a remote station under atmospheric turbulence conditions is disclosed. The remote station includes an entirely different type of retroreflector that does not use the conventional type of retroreflection, but instead consists of two sets of lenslets coupled with single-mode fiber array, called fiber "retro". Amplified retromodulation is achieved requiring only one single optical amplifier and one single modulator. A transmitter located at the base station sends an interrogating optical beam to the fiber "retro" which modulates the optical beam according to the input signal/data, and redirects the modulated optical beam to the base station for detection by a receiver. The present invention includes the capabilities of providing Identification of Friend-or-Foe (IFF), secure communication, and a means of achieving a wide field-of-view (FOV) with a fiber-coupled lenselet array.

9 Claims, 7 Drawing Sheets

U.S. PATENT DOCUMENTS

| | | | | |
|---|---|---|---|---|
| 6,239,888 B1* | 5/2001 | Willebrand | | 398/129 |
| 6,246,497 B1* | 6/2001 | Bateman et al. | | 398/25 |
| 6,282,337 B1* | 8/2001 | Horwitz et al. | | 385/24 |
| 6,400,871 B1* | 6/2002 | Minden | | 385/39 |
| 6,493,123 B1* | 12/2002 | Mansell et al. | | 398/169 |
| 6,501,581 B1* | 12/2002 | Snyder et al. | | 398/129 |
| 6,545,787 B1* | 4/2003 | Lenormand et al. | | 398/121 |
| 6,570,695 B1* | 5/2003 | Pribil et al. | | 398/204 |
| 6,585,432 B1* | 7/2003 | Palese | | 398/139 |
| 6,624,916 B1 | 9/2003 | Green et al. | | |
| 6,657,783 B1* | 12/2003 | Presby et al. | | 359/399 |
| 6,661,948 B2* | 12/2003 | Wilde | | 385/24 |
| 6,778,779 B1* | 8/2004 | Shay et al. | | 398/41 |
| 6,798,941 B2* | 9/2004 | Smith et al. | | 385/18 |
| 6,834,164 B1* | 12/2004 | Chan | | 398/129 |
| 6,850,662 B1* | 2/2005 | Mills et al. | | 385/18 |
| 6,954,302 B2 | 10/2005 | Sayyah et al. | | |
| 6,978,061 B1* | 12/2005 | Tabuchi | | 385/18 |
| 7,079,774 B2* | 7/2006 | Sidorovich et al. | | 398/129 |
| 7,142,348 B2* | 11/2006 | Sayyah et al. | | 359/291 |
| 7,187,815 B1* | 3/2007 | Sweatt et al. | | 385/12 |
| 7,224,905 B2 | 5/2007 | Ruggiero | | |
| 7,283,751 B2* | 10/2007 | Bruesselbach et al. | | 398/119 |
| 7,308,207 B2* | 12/2007 | Chen | | 398/170 |
| 7,379,673 B2* | 5/2008 | Krill et al. | | 398/118 |
| 7,408,639 B1* | 8/2008 | Strasser et al. | | 356/328 |
| 7,457,545 B2* | 11/2008 | Wirth et al. | | 398/119 |
| 7,561,802 B2* | 7/2009 | Krill et al. | | 398/121 |
| 7,565,081 B1* | 7/2009 | Britz et al. | | 398/70 |
| 7,603,041 B2* | 10/2009 | Varshneya et al. | | 398/170 |
| 7,643,755 B2* | 1/2010 | Rafferty et al. | | 398/131 |
| 7,720,388 B2* | 5/2010 | Varshneya et al. | | 398/137 |
| 7,831,150 B2* | 11/2010 | Roes et al. | | 398/130 |
| 7,912,331 B1* | 3/2011 | Yang | | 385/39 |
| 8,041,161 B1* | 10/2011 | Lane et al. | | 385/31 |
| 2002/0109887 A1* | 8/2002 | Aburakawa et al. | | 359/172 |
| 2002/0154364 A1* | 10/2002 | Green et al. | | 359/172 |
| 2003/0001073 A1* | 1/2003 | Presby et al. | | 250/201.9 |
| 2003/0058506 A1* | 3/2003 | Green et al. | | 359/172 |
| 2003/0067657 A1* | 4/2003 | Dimmler et al. | | 359/159 |
| 2004/0052465 A1* | 3/2004 | Verbana et al. | | 385/49 |
| 2006/0239696 A1* | 10/2006 | Sayyah et al. | | 398/173 |
| 2006/0291864 A1* | 12/2006 | Pavelchek | | 398/129 |
| 2009/0202254 A1* | 8/2009 | Majumdar et al. | | 398/140 |
| 2009/0232509 A1* | 9/2009 | Heikenfeld et al. | | 398/118 |
| 2010/0135668 A1* | 6/2010 | Amadeo et al. | | 398/115 |

OTHER PUBLICATIONS

G.O. Olsen et al, "Coherent CO2 laser communication system with modulable retroreflectors," Appl. Opt. 34 (12), 2033-2044, 1995.

Changpug Luo et al, "Optical Micromechanical System Array for Free-Space Retrocommunication," IEEE Photonics Technology Letters, vol. 16, No. 9, Sep. 2004.

J. MacCannel et al, "Full-Duplex Communication on Single Laser Beam, " Proceedings of the Solid State Diode Laser Technology Review 2002, Albuquerque, New Mexico, May 2002.

J.L.Murphy et al,"FM-MRR Analog Audio System," Proc. SPIE, vol. 5892, 2005.

T.M.Shay et al, "2.5-Gbps Amplified Retro-Modulator for Free-Space Optical Communications," Proc. SPIE, vol. 5550, pp. 122-129, 2004.

Linda M. Wasiczko et al, "Optical Communication and Navigation for Spacecraft Docking using Modulating Retroreflectors,"Proc. SPIE, 2005.

W.S. Rabinovich et al, "Performance of Cat's eye modulating retroreflectors for free-space optical communications," Proc. SPIE, vol. 5550, 2004.

Peter G. Goetz et al, "Modulating Retroreflector implementation of MIL-STD 1553 Protocol with Free-Space Optics," Proceedings of the 2003 IEEE Aerospace Conf, Paper No. 1559.

G.Charmaine Gilbreath et al, "Modulating Retro-Reflectors for Space, Tracking, Acquisition and Ranging using Multiple Quantum Well Technology," Proc. SPIE, vol. 4821, 2002.

D.S. Gunawan et al,"Micromechanical corner cube retroreflectors as a communication link," Sensors and Actuators A, vol. 46-47, pp. 580-583, 1995.

V.Handerek et al, "Feasibility of retroreflective free-space optical communication using retroreflectors with very wide field of view," Proc. SPIE,vol. 5614 (European),2004.

G.Charmaine et al,"Real Time Video Transfer using Multiple Quantum Well Retromodulators," Proc. SPIE, vol. 4821, pp. 155-162, 2002.

H.Hemmati et al,"Retro-Modulator Links with a Mini-Rover, " Proc. SPIE, vol. 5338, pp. 50-55, 2004.

W.S. Rabinovich et al,"Free-Space optical communication link at 1550 nm using multiple-quantum-well modulating retroreflectors.." Optical Engineering, vol. 44(5),May 2005.

W.S.Rabinovich et al, "45-Mbit/s cat's-eye modulating retroreflectors," Optical Engineering, vol. 46(10), Oct. 2007.

* cited by examiner

WIDE FIELD-OF-VIEW AMPLIFIED FIBER-RETRO FOR SECURE HIGH DATA RATE COMMUNICATIONS AND REMOTE DATA TRANSFER

FIELD OF THE INVENTION

The present invention relates to devices for passive free-space optical communications and more specifically to retro-reflecting devices using fiber-retro concept with unique secure optical Identification of Friend-or-Foe (IFF) capability.

BACKGROUND OF THE INVENTION

The novel classes of modulated retro-reflective photonic devices described herein may be used for establishing free-space laser communication links, remote data monitoring, IFF (identification of friend or foe), and for enabling multi-port optical communications for optical networks (including relay nodes). Remote data monitoring and secure optical communications with satellites, airborne or ground-based platforms requires that the response to an interrogating light beam needs to be reflected back directly to the source of the light beam itself. One of the main reasons for this is that the pointing and tracking of the beam is eliminated as long as the interrogating light beam illuminates the retro-reflective device.

Systems for communications and identification between two locations using modulators and retroreflectors are known in the art. Issued patents that have addressed the need for laser retro-reflector system for remote data monitoring and IFF includes U.S. Pat. No. 4,731,879 to Sepp et al. entitled, "Remote Data Monitoring System," wherein a laser and a modulatable retroreflector for the remote interrogation of information from space or targets with a simultaneous IFF. In this system, a liquid crystal modulator is arranged in front of a retroreflector and is modulated by respective information. The system is complex, laser transmitter section comprises laser beam controller means including two-motor driven rotating optical wedge compensators for directing the laser beam, and the transmission frequency is limited to 1-7 kHz only because of the use of liquid crystal modulator. U.S. Pat. No. 4,361,911 to Buser et al. entitled," Laser Retroreflector System for Identification of Friend or Foe," also discloses a covert laser retroreflector system to establish IFF capability. The interrogator requires to be a high power laser, and the modulating rertroreflector may be an acousto-optic modulator, a parallel array Pockels cells, or a parallel array of transversely excited Stark Cell in front of a reflecting mirror. The frequency response using acousto-optic (AO) modulator was claimed to reach up to 960 kHz, and to 50 MHz using Pockels Cell modulator for $CO_2$ TEA laser. But $CO_2$ laser will need a cooled HgCdTe detector. Overall the system would require high power, for example for 10.6 µm radiation modulator requires 170-200 watts of RF power. U.S. Pat. No. 6,624,916 to Green et al., entitled, "Signaling System," describes a free-space point to multipoint signaling system using a retroreflector comprising a telecentric lens for receiving and focusing light from a light source and a reflecting means for said light back. The patent discloses a pixellated modulator forming part of the retroreflecting modulator unit. However, the modulators used are SEED (self-electro-optic effect device), already developed by the American Telephone and Telegraph Company (AT&T). But the range for this type of signaling system is limited to only 150 meters. Some other retroreflector devices for communications and modulators are described in U.S. patents: U.S. Pat. No. 3,989,942 to Waddoups, entitled, "Retro-reflecting laser responser and data modulator,"; U.S. Pat. No. 4,064,434 to Waksberg, entitled, "Retro-reflection communication system,"; U.S. Pat. No. 4,134,008 to de Corlieu et al, entitled, "Light-retroreflecting responser and data modulator arrangement,"; U.S. Pat. No. 4,209,689 to Linford et al, entitled, "Laser secure communications system,"; U.S. Pat. No. 4,887,310 to Meyzonnette, et al, entitled, "Identification system using a laser retro-reflecting and modulating set,"; U.S. Pat. No. 5,459,470 to Wooton et al, entitled "Beam steered laser system,"; U.S. Pat. No. 6,624,916 B1 to Green et al, entitled, "Signaling system,". U.S. Pat. No. 6,954,302 to Sayyah, et al., describes a conformal retro-modulator optical devise based on an array of multiple quantum well (MQW) devices disposed in a thin array. One of the other prior arts which also includes MQW device is U.S. Pat. No. 6,154,299 to Gilbreath et al., entitled, "Modulating Retroreflector using Multiple Quantum Well Technology," discloses a system for remote optical communications where the remote station includes a MWQ modulator, and drive circuitry that drives the MQW. The retroreflector reflects the modulated beam to the base station for detection by a receiver. One of the present patent application applicants, Thomas M. Shay has disclosed in U.S. Pat. No. 6,778,779 to Shay et al., entitled, "Full-Duplex Optical Communication Systems," a method of full-duplex communication using a method of encoding optical information wherein right-hand and left-hand circular polarizations are assigned to optical information. One possible application is for an earth to low orbit optical communications system implementing the full-duplex communication and circular polarization keying modulation format. Besides the above patents, there are a numerous published papers in the open literature where some implementations have attempted to describe modulating retroreflector for communications and other applications. In order to understand the uniqueness and the innovations of the present invention in this patent, a comparison of the various state-of-the-art modulating retroreflector technologies is summarized as follows. Swenson et al. SPIE Proceedings, Vol. 2990, pp. 296-310, 1997, the entirety of which is incorporated herein by reference, describes a Ferroelectric Liquid crystal technology: data rate=1-10 Kbit/s, physical aperture size=15 cm, full field-of-view (FOV)=±44.9°, range demonstrated=30 Km. Olson et al., *Appl. Opt.* 34 (12), Apr. 20, 1995, the entirety of which is incorporated herein by reference, describes a $CO_2$ laser communication system with modulable retroreflectors with frequency response to 3.5 kHz only with a range of 24 km. But the system requires a cooled detector, laser power of 10-15 W and coherent detection scheme. Luo, et al., IEEE Photonics Technology Letters, Vol. 16, No. 9, pp. 2045-204'7, 2004 discloses an optical micro-electro-mechanical system (MEMS) array: data rate=2.5 Kbit/s, wavelength=1.064 µm, physical aperture size=0.68 cm, range demonstrated=4 m. Bifano et al., http://people.bu.edu/bifano/Retro.html describes MEMS-based modulated retroreflector: data rate=10 KHz, physical aperture=5 mm, power consumption=5 mW, range demonstrated=30 m. MacCannell, et al., *Proceedings of the Solid State Diode Laser Technology Review* 2002, Albuquerque, N. Mex. May 2002, "Full-Duplex Communication on Single Laser Beam," described a liquid crystal-based shutter for retromodulation: data rate=20 Kbit/s, wavelength=0.852 µm, physical aperture size=2.26 cm, full FOV=±40.1°, power consumed=120 mW, range demonstrated=30 m. Joseph Ford of the University of California, San Diego described (see T. K. Chan and J. E. Ford, "Deformable MEMS micro mirror array for wavelength and angle insensitive retro-reflecting modulators," *Proceedings of the IEEE LEOS Annual Meeting*, Paper ThEE4, Puerto Rico, November 2004.) a MEMS based retromodulator: data rate=100 KHz, FOV=f 68°. Some other papers in the similar areas include: Gunawan et al, "Micromachined corner cube reflectors as a communication link," Sensors and Actuators A, vol. 46-47, pp. 580-583, 1995; Handerek et al, "Feasibility of retroreflective free-space optical communication using retroreflectors with very wide field of view," SPIE European Symposium on Optics/Photonics in Security and Defence, Proc. SPIE, vol. 5614, pp. 1-9, 2004. Other papers include the developments of the modulating retroreflectors (MRR) for free space optical communication links at the Naval Research Laboratory (NRL) since 1998. Some of the NRL's disclosures include: Gilbreath et al, "Real time video transfer using multiple quantum well retromodulators," Proc. SPIE, Vol. 4821, pp. 155-162, 2002; Gilbreath et al, "Modulating retroreflectors for space, tracking, acquisition and ranging using multiple quantum well technology," Proc. SPIE, Vol. 4821, pp. 494-507, 2002; Goetz et al, "Modulating retroreflector implementation of MIL-STD 1553 protocol with free-space optics," Proc. II Aerospace Conference Paper No. 1559, 2003; Rabinovich, et al, "Performance of Cat's eye modulating retro-reflectors for free-space optical communications," Proc. SPIE, Vol. 5550, pp. 104-114, 2004; Wasiczko et al, "Optical communication and navigation for spacecraft docking using modulating retroreflectors," Proc. SPIE, Vol. 5892, 2005; Murphy et al, "FM-MRR analog audio system," Proc. SPIE. Vol. 5892, 2005; Rabinovich et al., "Free space optical communications link at 1550 nm using multiple-quantum-well modulating retroreflectors in a marine environment," *Optical Engineering*, Vol. 44(5), May 2005: data rate=5 Mbps, FOV=f 60°, physical aperture size=0.63 cm, wavelength=1.55 μm, range demonstrated=2 km; Rabinovich et al, "45 Mbit/s cat's-eye modulating retroreflectors, Optical Engineering, 46(10), October 2007. Also Hemmati et al., Proc. SHE., Vol. 5338, pp. 50-55, 2004, "Retro-Modulator Links with a Mini-Rover,": describes a retro modulator at the data rate=10 Mbps with a range=2 km. Rabinovich et al., *Photonics Technology Letters*, November 2003 describes a Cat's Eye multiple quantum well modulating retro-reflector: data rate=50 Mbps, physical aperture=0.5-1 cm, FOV=±30°, wavelength=0.980 μm, power consumed=120 mW. Other recent patent includes the following: U.S. Pat. No. 7,224,905 B2 to Ruggiero, entitled, "Remotely-interrogated high data rate free-space laser communications link," May 29, 2007 describes a system and method of remotely extracting information from a communications station by interrogation with a low power beam using the property of nonlinear phase conjugation. The only description of the background art which is related to the present patent is the work by Dr. Thomas M. Shay, who is one of the present patent applicants: Shay et al., *Proceedings of the SPIE, Vol.* 5550, pp. 122-129, 2004, "2.5-Gbps Amplified Retro-Modulator for Free-Space Optical Communications," describes the first amplified retro-modulated free-space optical communications link: physical aperture=2 cm, pigtailed to a single-mode fiber, wavelength=1.55 μm, FOV=0.004°, power consumed=120 mW.

The prior art using the conventional retroreflector modulation technologies, previously described, have the following drawbacks and limitations. Ferro-electric-liquid crystal (FLC) modulators can achieve modulation rates of only a few kilohertz, which severely limit their bandwidth. Multiple Quantum Well modulated retroreflector can attain a data rate of about 50 Mbps, but are extremely complex devices, limited to relatively small devices and are prohibitively expensive. Neither of those retromodulators can provide a long range (more than a few km) communications link at a high data rate (higher than 50 Mbps). Even the work of Shay et al.'s attempt to couple free-space optics (FSO) signals directly into a "single" single-mode fiber (SMF) to demonstrate 2.5-Gbps data rate was limited to its extremely small FOV of about ±0.004° only, and the demonstration was limited to laboratory experiment without any results for any range (link). None of the FLC, MQW-based and FSO-SMF retromodulation technology has any IFF (identify, friend or foe) capability.

SUMMARY OF THE INVENTION

What is unique about this patent is the ability for the first time to couple light from a wide field-of-view into a single mode optical amplifier and return that light to the source. The uniqueness is accomplished by the receiving optics, the N×1 combiner in combination with the fiber tap and the probe photodetector, the electronic N×1 switch, and the 1×N spatial router, and the single mode optical amplifier. This system of elements identifies which direction the incident light arrives from, couples the light into a low noise single mode amplifier, and finally redirects the amplified and modulated light back to the source terminal.

Accordingly, it is an object of this invention to overcome these and other limitations and difficulties by providing an alternate and entirely different type of retroreflector that does not use the conventional type of retroreflection where an electromagnetic wave impinges upon and is merely reflected by a surface element (FLC or MQW). Instead, the alternate retroreflector consists of two sets of lenslets coupled with single-mode fiber (SMF) array and is called fiber "retro".

This aspect of the present invention also provides a retroreflector comprising a telecentric lens for both receiving and transmitting light. The telecentric lens allows receiving and focusing light from a light source and a lenslet array located at the focal plane of said telecentric lens collects said light and transmits back via another array of lenslets to said light source.

It is another object of the present invention to optically communicate to a base station without the need for including a transmitter or a pointing and tracking system at the remote station capable of accepting an optical signal within a wide field-of-view (FOV).

Another object of this invention is to provide a compact system capable of high data rate optical communication system while keeping the power consumption at the remote end very low.

Another object of the present invention is to provide a means of achieving a wide field-of-view (FOV) fiber "retro" system where the remote device can accept a wide angle of interrogating signal.

Another object of the present invention is to provide a pixellated fiber array system for both incoming and outgoing optical beams to maintaining one-to-one correlation between each set of lenslet/fiber array which can also determine the exact location of the source.

Another object of the present invention is to provide an amplifying retromodulator device using an optical amplifier where the amplified retromodulator provides a factor of a few hundred increase in the modulated retro-reflector return signal compared with a conventional modulated retroreflector of the same aperture. To put it in another way, an amplified retromodulator can provide the same return signal as a passive retromodulator that is orders of magnitude larger and considerably heavier, thus significantly reducing the weight and power consumption of the retromodulator that delivers the required signal.

Another object of this present invention is to provide an amplified retromodulator requiring only one single optical amplifier and one single modulator for the whole unit using a fiber combiner at the receiving side and a spatial router at the transmitting side of the system.

Another object of the present inventions is to provide a fiber "retro" which has a long-range capability (10 s to 100 s of Km). This is possible because of the amplification of the return signal to improve signal-to-noise ratio (SNR) whereas other existing retromodulators have a range of a couple of Km.

Another object of this present invention is to provide a system to operate under atmospheric turbulence conditions.

Another object of this present invention is to provide an extension of this system to be able to communicate two-way (transceiver at both base and remote sites).

Another object of the present invention is to provide a system which can offer covert operation with the advantage of secure communications.

A further object of the present invention is to provide Identification of Friend-or-Foe (IFF) capability where the remote fiber "retro" is equipped with a decoder/encoder containing pre-assigned code key data.

Other objects of this present invention include: (1) all-optical repeater without OEO (optical-to-electrical-optical) conversion process and (2) Wavelength division multiplexer (WDM) routing terminal.

BRIEF DESCRIPTION OF THE DRAWINGS

For a better understanding of the invention as well as other objects and further features thereof, reference is made to the following Description of the Preferred Embodiments, wherein.

DESCRIPTION OF THE PREFERRED EMBODIMENTS

It will be understood that the following description of the invention of the preferred embodiments do not limit the invention to those embodiments and it is intended to cover all aspects, alternatives, modifications and equivalents as defined by the appended claims.

The present invention is a system allowing remote data monitoring of hard-to-access locations that employs a laser interrogator and an actively modulated retroreflector in a two-way coded communication scheme. This invention also provides a new method for simultaneous identification of friend-or-foe (IFF), direction location of the source signal, and secure communications.

Figure 1A:
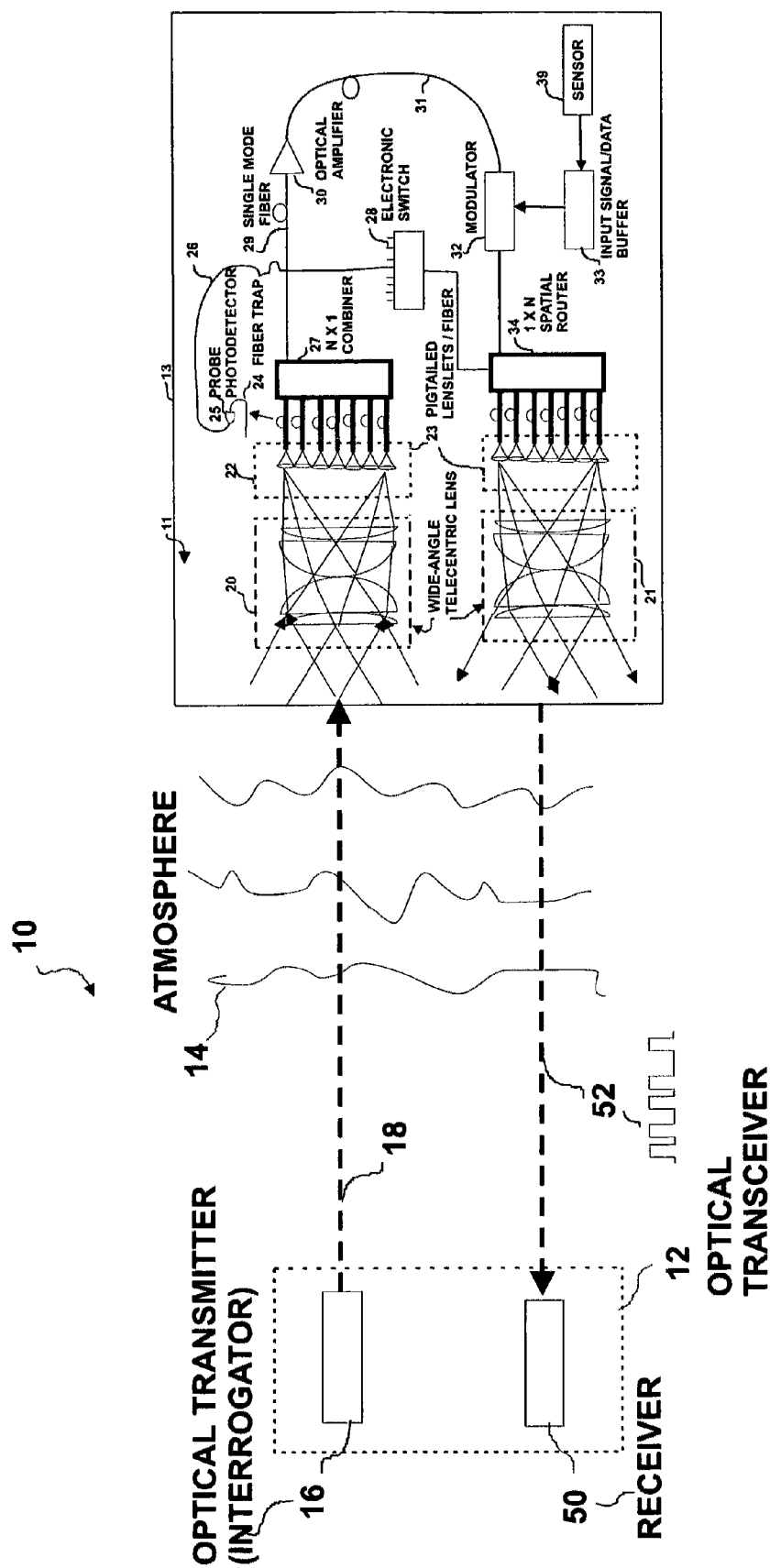
FIG. 1a is a schematic block diagram of a modulated fiber "retro" system including a laser transceiver cooperating with a fiber "retro" for providing a remote data monitoring ability through the atmosphere.
Figure 1B:
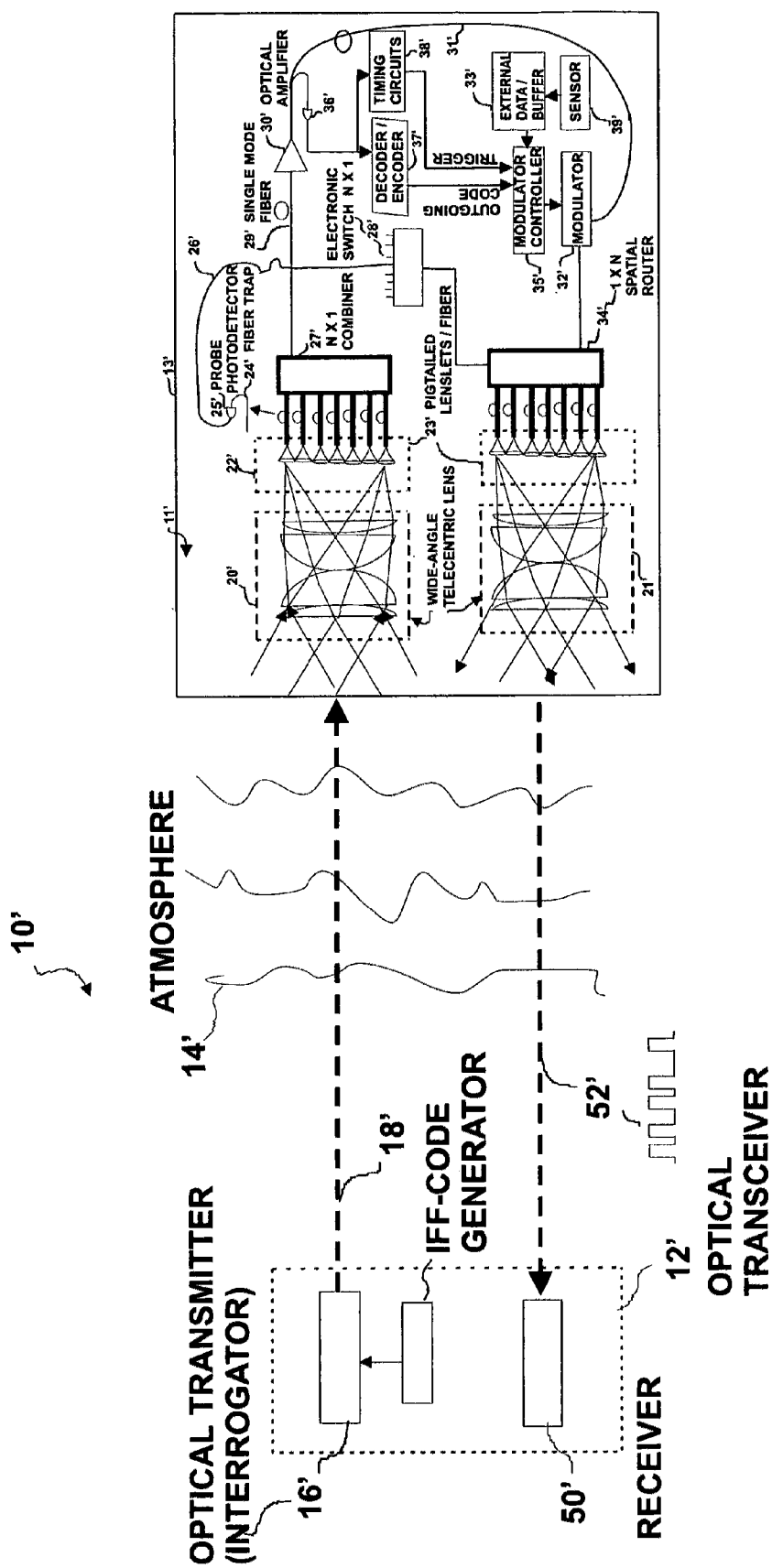
FIG. 1b is a diagram of a modulated fiber "retro" system showing an alternative embodiment of the present invention for secure communication and identification through the atmosphere.

Referring to the detailed drawings (wherein like numerals in different figures represent the same structures or elements), FIG. 1a shows an overview of a preferred embodiment of a novel remote data monitoring system 10. FIG. 1b shows an overview of another embodiment which includes the IFF capability of the communication system 10' according to the present invention. Throughout this discussion, elements numbered without prime symbols refer to elements in the FIG. 1a embodiment, while elements with prime symbols refer to the corresponding elements in the FIG. 1b embodiment. The system comprises a transceiver (transmitter and receiver) at base station 12, 12' and a remote station 13, 13', separated by the atmosphere 14, 14'. Transmitter 16, 16' transmits an interrogation beam 18, 18' through the atmosphere 14, 14' to remote station 13, 13' having an amplified fiber retro-modulator (AFRM) 11, 11', which returns a reflected modulated beam 52, 52' to a receiver 50, 50' back at the base station 12, 12'. The atmosphere can constitute a turbulent and scattering medium, and is the communication channel for both outgoing transmitting and incoming modulated reflected beams. Either the base station or the remote station can be on the ground or in space, so that remote interrogation from or to space is possible.

In the embodiment depicted in FIG. 1a, the laser transmitter 16 sends the interrogation beam 18 that can be a constant average power beam to the remote station 13. The remote monitoring is accomplished by relaying data from unattended sensors located at the remote station according to the present invention.

Figure 2:
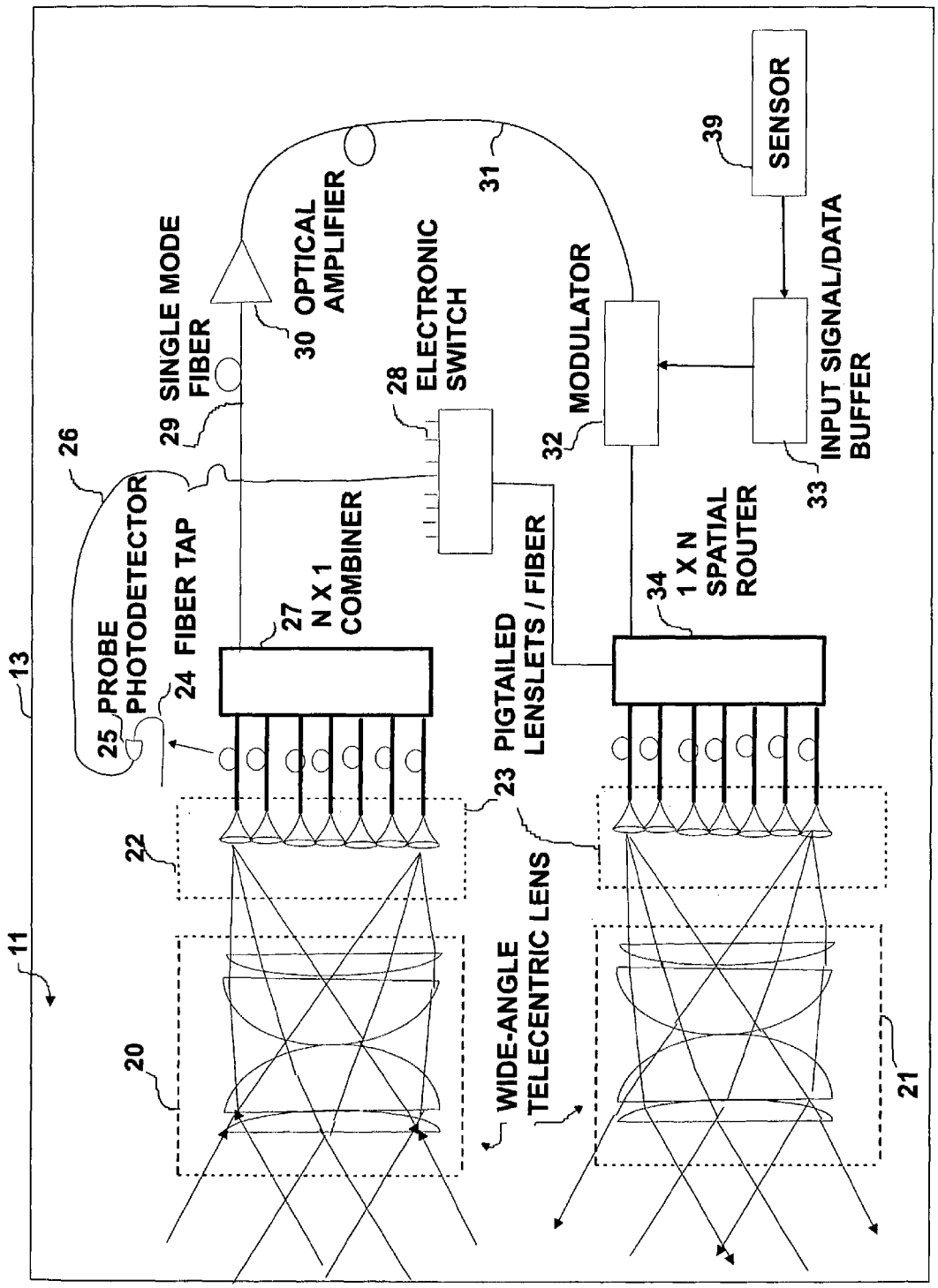
FIG. 2 is a schematic diagram of the fiber "retro" unit of the overall system for remote data monitoring purpose according to the present invention.

FIG. 2 is a block diagram of an embodiment of the amplified fiber retro-modulator (AFRM) 11. The interrogator (illuminating) signal is received at the remote station 13 by receiving input optics which consists of a wide-angle telecentric compound lens 20 and a lenslet/fiber coupler array 22, which efficiently couples incident light into single-mode-fibers (SMF). The lens puts the far-field plane of the input at the input plane of the lenslet array, so that each lenslet in the array corresponds to a different input-beam angle. For a collimated input from a distant interrogator, the spatial displacements in the far field (i.e., at the focal plane) map to angular displacements in the near field. This means that each of the N lenslets corresponds to a different direction to the laser interrogator. The large total field-of-view (FOV) is thus equal to the sum of the individual FOVs of all the lenslets. High-efficiency optical couplers direct the signal from each lenslet into a SMF.

The incident power on each individual lenslet/fiber coupler is sampled with a low outcoupling fiber tap 24 combined with a low-speed photodetector 25 attached to each coupler. The individual photodetectors detect the input time-average powers, which are input to the electronic switch (N×1, i.e., N inputs and 1 output) 28. The electronic switch 28 selects the largest input and sends the indices (e.g., the row/column information) to the spatial router (1×N) 34. The input signals from the individual lenslet/fiber couplers are then combined with an N×1 combiner 27 into a single-mode-fiber 29 which leads to an optical amplifier 30. The amplified optical signal is then modulated by the modulator 32 according to the external data buffer 33, the order of the modulation and amplification may be interchanged if required by the power handing capability of the modulator. The data buffer receives data from some kind of monitoring sensor 39, and could either output real-time data or data stored over some previous time interval. The monitoring sensor could be an imaging camera, audio recorder, any instrument that measures any environmental property of interest, or perhaps a message from an individual. The amplified and modulated beam is input to the spatial router (1×N) which sends it to the particular lenslet/fiber in the transmitting array 23 with row/column indices selected by the electronic switch. The outgoing beam is collimated by a second wide-angle telecentric compound lens 21 in the transmitting exit optics, which is co-aligned with the receiving input optics, to return the signal back towards the laser interrogator. Alternatively, in some cases the receive and transmit fibers can be interleaved and the same optic 20, can be used for receive and transmit.

For the separate transmit 21 and receive 20 optic, there is a one-to-one correspondence between the input receiving lenslets and the output transmitting lenslets, such that the input/output angles for each corresponding pair are parallel, but in opposite directions. Transmitting the light exactly back along the incident path effectively completes the process of retro-reflection even though the incident signal is not actually being reflected. The location of this lenslets in the output lenslet array corresponds to the output angle that is aimed back towards the laser interrogator. The information on the lenslets location, and hence on the direction of the interrogator unit, may also be output locally. This method of returning the incident signal provides a novel means of determining also the exact angular location of the source.

In the FIG. 1b embodiment, there is an added capability of IFF and secure encoded communication. Here, the laser transmitter 16' sends the interrogation beam 18' modulated with the IFF-code by means of an IFF-code generator 17'. The information from the external data buffer 33' is transmitted by the amplified fiber retro-modulator (AFRM) 11' back to the receiver 50' which here includes an IFF-code filter.

Figure 3:
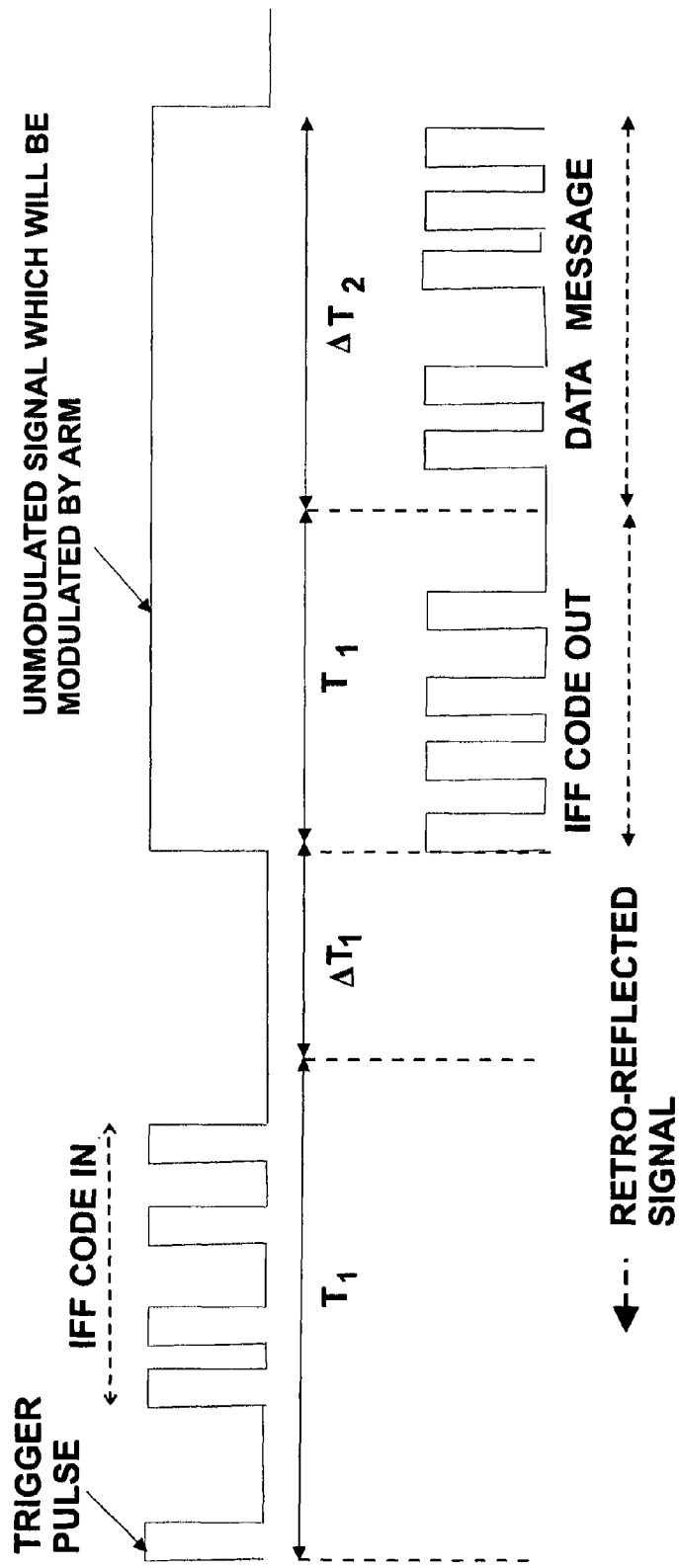
FIG. 3 illustrates the concept of achieving IFF capability using the transmitted and received pulses with the laser interrogator/transceiver and the fiber "retro" using the embodiment of the present invention as shown in FIG. 1b.

FIG. 3 illustrates conceptually one possible embodiment of the signal timing of the overall secure communication system, many other embodiments are possible. An interrogation message pulse train is followed by a time delay and then an unmodulated pulse. The interrogation message pulse train of duration within $T_1$ contains a trigger pulse followed by a pre-assigned IFF code. The start of the unmodulated pulse follows the start of the trigger pulse by a predetermined time $T_1 + \Delta T_1$, where the delay interval $\Delta T_1$ allows time for IFF code verification by the AFRM. The unmodulated pulse has duration $T_1 + \Delta T_2$, where the interval $\Delta T_2$ allows time for the AFRM to return a data message. The start of the trigger pulse is clocked into both the interrogator and the AFRM clocks to synchronize them, allowing for beam transit time.

During the interrogation time interval $T_1 + \Delta T_1$, the AFRM does not produce any output, so as to remain covert, but is only alerted to be ready to modulate the unmodulated pulse when it arrives. If the received IFF code is verified during $\Delta T_1$, then the AFRM is activated to produce a modulated output; otherwise, it remains inactive. Over the duration of the unmodulated pulse, the AFRM, if activated generates a "reply signal" to identify it. This signal is intensity modulated, or OOK (on-off-keying)-modulated, according to a pre-assigned code built into the decoder/encoder 37' in the AFRM. Additional secure communication data may also be included in the modulated return signal during the $\Delta T_2$ interval. The available amount of this additional information will be limited by $\Delta T_2$, and hence by the length of the unmodulated pulse. As shown in FIG. 1b, the coded reply signal is then returned back to the dedicated receiver 50' in the interrogator unit, which checks the coded signal against a database of codes for friendly devices and determines whether the retromodulating device is friendly. This way the receiver in the interrogator unit makes sure of the authenticity of the received data from the AFRM.

Figure 4:
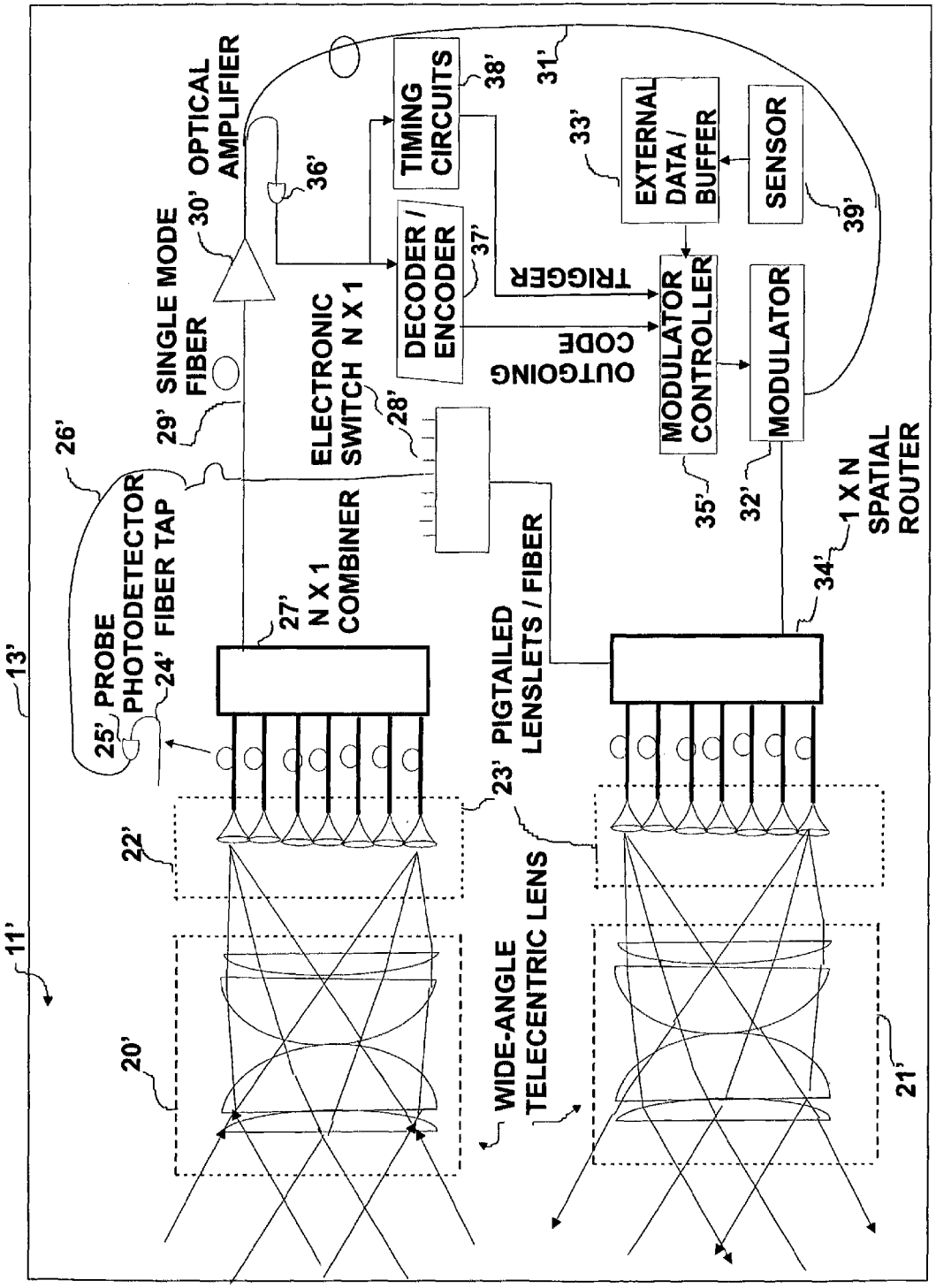
FIG. 4 is a schematic diagram of the fiber "retro" unit of the overall system for secure communication and identification ability according to the present invention.

FIG. 4 is a block diagram of an embodiment of the amplified fiber retro-modulator (AFRM) 11' that includes IFF and encryption capability. Some of the elements are similar to that of remote data monitoring system as shown in FIG. 2 except there are some additional elements in the IFF system. The interrogator (illuminating) signal is received at the remote station 13' by receiving input optics consisting of a wide-angle telecentric compound lens 20' and a lenslet/fiber coupler array 22', similar to the system of FIG. 2.

The incident power on each individual lenslet/fiber coupler is sampled with a low outcoupling fiber tap 24' combined with a low-speed photodetector 25' attached to each coupler. The individual photodetectors detect the input time-average powers, which are input to the electronic switch (N×1, i.e., N inputs and 1 output) 28'. The electronic switch 28' selects the largest input signal and sends the indices (e.g., the row/column information) to the spatial router (1×N) 34'. The input signals from the individual lenslet/fiber couplers are then combined with an N×1 combiner 27' into a single-mode-fiber 29' which leads to an optical amplifier 30'. A portion of the optical amplifier output signal is sampled with a low outcoupling fiber tap attached with a high speed photo detector, 36'. This high speed photo detector detects the IFF-code pulse sequences and the output of this detector is input to both the decoder/encoder and the timing circuits. The decoder decodes the coded pulse sequences and verifies its authenticity of the code. The incident power on each individual lenslet/fiber coupler is sampled with a low out coupling fiber tap combined with a slow speed photo detector, 25' which is attached with each lenslet/fiber coupler. The individual photo detectors just detect the input average powers (integrated power) and are connected with the electronic switch (N×1), 28'. The electronic switch selects the largest input. But if the electronic switch is turned ON by the output of the decoder/encoder, the switch selects the largest input and sends the indices (e.g. the row/column information) to the spatial router. On the other hand, if the switch does not receive verification from the decoder, then it leaves the router in its default OFF state, and there is no output. In remote locations where power consumption is a concern, then the decoder/encoder output could also be used to turn off the optical amplifier and the modulator power supply (not shown in the diagram of FIG. 4, but can be implemented), until a verified code is received. The decoder/encoder will have a microprocessor that has the corrected pre selected encrypted message built therein for proper detection and decoding with preprogrammed code that modulates the retroreflector device. Thus a friendly target will be able to send a reply signal with the correct modulated code. As soon as the encrypted interrogation message is received by the amplified fiber retro-modulator, 11' it checks if the interrogation signal is correct, and if so, it retroreflects a return modulated reply signal with a correct pre-assigned code back to the dedicated receiver in the interrogator. Only a friendly target equipped with the modulated reflector will send the pre-assigned coded message back. Otherwise the target will be assigned as foe. The decoded pulse sequence is sent to the modulator controller. The output of the timing circuit, 38' produces timing pulses to trigger the outgoing code and the outgoing data. The modulator controller, 35' also accepts external data signals. The modulator controller outputs the voltage signals into the modulator. The main part of the optical signal goes through the amplifier, and then through the modulator and the spatial router, 34' into the output optics. Thus as soon as the encrypted interrogation message is received by the amplified fiber retro-modulator, 11' it checks if the interrogation signal is correct, and if so, it retroreflects a return modulated reply signal with a correct pre-assigned code back to the dedicated receiver in the interrogator. Only a friendly target equipped with the modulated reflector will send the pre-assigned coded message back. Otherwise the target will be assigned as a foe.

Figure 5:
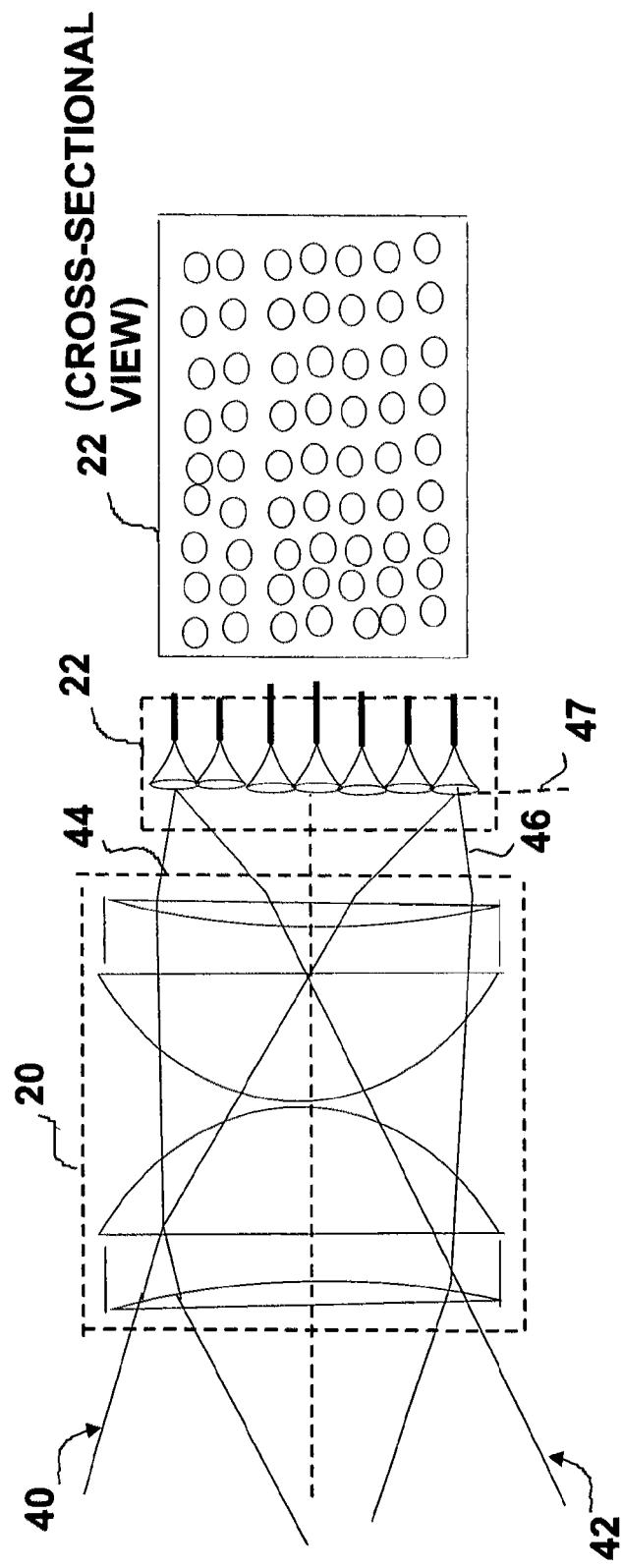
FIG. 5 is a schematic diagram of a wide-angle telecentric lens and an array of pigtailed lenslets/fiber arrangement for both the input incoming light and retroreflcted outgoing light according to this invention. A cross-sectional view of the two-dimensional lenslet array is also shown next to this array.

The interrogation beam 18, 18' is received in the AFRM device 11, 11' by the Wide-angle telecentric lens 20, 20' which ensures that the outgoing rays from the telecentric lens hits the lenslets 22, 22' at almost perpendicular angles. FIG. 5 schematically illustrates the telecentric 20 and the lenslets/fibers unit 22. Similar description also applies to the telecentric 20' and the lenslets/fibers unit 22' for the AFRM system with IFF capability. A cross-sectional view of the lenslet array is also shown on the right side. Note that in the FIG. 5, the elements numbered without with prime symbols refer to elements in the FIG. 2 embodiment, while elements number with prime symbols (not shown to avoid unnecessary repetition) will refer to the corresponding elements in the FIG. 4 embodiment. Furthermore, the arrangement of 20, 22 which constitutes the receive optics is identical to the arrangement for the transmitting optics (not shown again to avoid repetition) where the incoming interrogation beam will be amplified and modulated and finally returned (re-directed) back to the interrogator with the directions of the optical rays going opposite. The wide-angle telecentric lens allows to accept incoming interrogator signal from a wide angle (more than ±30° to 40°) to achieve a large field-of-view (FOV)(~80°) of the AFRM system 11, 11'. Available commercial lenses can map the incident angles onto different spatial portions of the image plane so that the rays are perpendicular to the image plane, where the lenslet array is placed. Due to the telecentricity of the telecentric lens 20, the light incident on the lens system is focused at the rear image plane 47 in such a way that the principal rays such as 44 and 46 which emerge from the lens system are perpendicular to the back focal plane 47. By using a telecentric lens 20, and by placing the lenslet array at the back focal plane 47 of the telecentric lens 20, the principal rays of the laser interrogation beam 18 will be nearly perpendicular to the surface of the lenslets, regardless of the positions of the laser interrogator base station 12 within the fiber retro-modulator's field-of-view. Consequently a high efficiency optical coupling for subsequent amplification and modulation can be achieved. As shown, in this embodiment, the wide angle telecentric lens and an array of lenslets thus comprises the receive optics. The size of the lens elements is a design choice and depends upon the particular requirements of the FOV of the AFRM system. Similar discussions and comments apply to the transmit optics 21 and lenslet array 23 as well as for corresponding elements number with prime symbols for receive optics 20, 22' and the transmit optics 21, 23' in the FIG. 1b.

An efficient coupling of the incident light to the telecentric lens 20 and lenslet array with single-mode fiber pigtailed collimator 22 is achieved by proper design of the lenslet and telecentric lens parameters. Small misalignments due to thermal and mechanical disturbances and the depth-of-focus (DOF) are the criteria to be considered in this design. The depth-of-focus for ideal imaging optical system is given by:

$$DOF = \frac{d}{2 \cdot NA} \quad (1)$$

Where d represents the focal spot and NA represents the numerical aperture of the optical fiber. For conventional single-mode-optical fiber, the mode-field-diameter is 10.5-μm and the numerical aperture is 0.13. Thus the depth-of-focus for direct coupling by imaging optics is 40-μm. Thus a small change in the position of the lenses due to the typical thermal expansion or mechanical vibrations experienced in the field produce the severe coupling efficiency losses. Efficient coupling of light into a single-mode-optical fiber requires that the light at the entrance of the receiver must have an &endue that does not exceed the &endue of the single-mode-optical fiber. The &endue of a single-mode-optical fiber is constrained by the upper limit on the V parameter for a single-mode-optical fiber:

$$V = \frac{2\pi a_{core}}{\lambda} \cdot NA \quad (2)$$

$$= \frac{2\pi a_{core}}{\lambda} \cdot \sin(\theta) \leq 2.405$$

Where $a_{core}$ represents the fiber core radius, $\lambda$ represents the operating wavelength, and NA represents the fiber numerical aperture, $\theta$ represents the acceptance angle of the fiber. The étendue of a single-mode-fiber is:

$$\xi_{SMF} = \pi \cdot (a_{core} \cdot NA)^2 \leq \frac{(1.2025 \cdot \lambda)^2}{\pi} \quad (3)$$

where $\xi_{SMF}$ represents the &endue of a single-mode-fiber. For nearly all of the 1550-nm telecommunications imbedded optical fiber, the product of the fiber mode-field-diameter, MFD, times 2 NA is, 1.36-μm radians, the upper limit allowed by, equation (3).

In this invention the combined wide-angle lens 20 and the lenslets/SMF pigtailed collimator 22 provides the needed requirements for coupling the incident light onto the lenslets array. The input optics deliver the light from difference angles to the separate lenslets that couple the signal light into the single mode fibers. Thus the input optics takes the light from separate angles and maps the incident light from different input angles to specific locations on the lenslet array and also provides nearly collimated light at each lenslet. In free space laser applications, a plane wave is a reasonable approximation to the received wavefront if the atmosphere does not distort the wavefront too much. The optimum coupling of a plane wave into a single mode fiber is ~81%. Furthermore, the efficiency of coupling into an optical fiber falls to roughly 50% when the angle of incidence upon the coupling lens results in the center of the beam falls at the edge of the core of the fiber.

In a preferred embodiment of the communication and remote identification system of the present invention, a wide-angle telecentric lens is incorporated with an array of the single element free-space optics-single-mode fiber (FSO-SMF) couplers as shown in the FIGS. 2, 4 and 5. The incident signal photons enter the telecentric lens, imaged onto the lenslet array, the output signal (after the combiner) is then optically amplified in a low-noise highly efficient erbium-doped fiber amplifier (EDFA). Next the signal is modulated in a commercial telecommunications electro-optical intensity modulator according to the external data (for remote data monitoring application) and outgoing code signal (for IFF application). Finally the modulated and amplified photons are sent out the exit port (transmitting optics) back to the interrogator (transmitter) location. If the entrance and exit apertures are aligned to produce parallel beams, then this configuration serves as an amplified retro-reflector/retromodulator. As described in the present invention, an amplified fiber retromodulator (AFRM) can be developed using high efficiency free-space optics (FSO) (an wide-angle telecentric lens and an array of lenslets) and an array of SMF couplers with telecommunications grade high-speed modulators and very low-power consumption EDFAs. Commercial fiber coupled electro-optical modulators can operate at data rates of >10-Gb/s and a 2.5-Gb/s modulator consumes only ⅛-watt when unbiased data is transmitted. These modulators have extinction ratios of >20-dB and have insertion losses of 3-dB. EDFA design calculations indicate that a low-noise EDFA with a gain of 33-dB that consumes only 200-mW of electric power is easily obtainable. The low-power consumption optical amplifier is therefore an integral part of the amplified retromodulator system in the present invention which does not exist in any other present retromodulator concept. It will be shown below that the AFRM is capable to return signal a few thousand (~1000 s) times the return signal from an identical aperture conventional modulating retro reflector (MRR) that can simultaneously be operated at several Gb/s modulation rates. The total power consumption of an amplified 2.5-Gb/s AFRM should be near 350-mW, or about the power consumption of two cell phones.

A note on the effects of atmospheric turbulence on the AFRM: Atmospheric Turbulence effects and FOV consideration for input and retroreflected communication signals.

The effect of atmospheric turbulence on such a proposed system using an array of fiber couplers needs to be evaluated. This is best understood by estimating the variance of angle-of-arrival fluctuations caused by the presence of atmospheric turbulence in between the laser transmitter and the modulated retro-reflector. The variance in angle-of-arrival fluctuation can be written as:

$$\sigma_\alpha^2 = 2.914 D^{-1/3} H^{-5/3} \int_0^H z^{5/3} C_n^2(z)\,dz \quad (4)$$

where D=aperture diameter, $C_n^2$ is the turbulence strength and H is the altitude. If the communication link is along a slant range, then the $C_n^2(z)$ should be replaced by sec $\theta$ $C_n^2(z)$, where $\theta$ is the zenith angle (away from the vertical) and the limit of integration should be taken as the slant range. As an example, for a vertical communication link range, H=20 km, using the atmospheric model (HV21), the value of the variance in angle-of-arrival fluctuations due to atmospheric turbulence is, $\sigma_\alpha \sim 32.5 \times 10^{-8}$ rad. This value does not seem to impose a problem in pointing requirement of a single element amplified retro-modulator.

A simple theoretical model that allows a comparison of the AFRM and conventional modulated retro reflector (MRR) performance is described next. In a typical modulated retro reflector optical communications system, the intensity incident upon the retro-reflector is, $$I_{inc} = \frac{4 \cdot P_T \cdot \eta_T \cdot T_{Atm}}{\pi \cdot \theta_T^2 \cdot R^2} \quad (5)$$

where $P_T$ represents the transmitter power, $\eta_T$ represents the efficiency of the transmit optics, $T_{Atm}$ represents the atmospheric transmission efficiency, R represents the link range, and $\theta_T$ represents the divergence of the transmitted beam.

The net gain of the amplified retro-modulator system can be obtained by taking into the account the losses of each element and the gain of the EDFA. The net gain of this system in dB is $$G_{net\_dB} = L_{Input\_coupler\_dB} + L_{mod\_dB} + G_{EDFA\_dB} + L_{output\_coupler\_dB} \quad (6)$$

where $L_{input\_coupler\_dB}$, $L_{modulator\_dB}$, and $L_{output\_coupler\_dB}$ represent the respective losses of those three elements in dB and $G_{EDFA\_dB}$ represents the EDFA gain in dB. To be conservative we use the 47% input coupler efficiency that we have already measured that yields a loss of −3.3-dB, we assume an output coupler efficiency of 90% or −0.05-dB, the modulator has a−3-dB loss and the EDFA has a 33-dB gain. Thus the net gain is 26.65-dB or 460.

The signal power received at the base station of the laser interrogator after the round-trip path propagation and amplification at the AFRM is given by $$P_{rec\_Sat.} = G_{net} \cdot \frac{16 \cdot P_T \cdot \eta_T \cdot T_{Atm}^2 \cdot D_{retro}^4 \cdot A_{rec-Sat}}{5.954 \cdot \pi \cdot \theta_T^2 \cdot R^4 \cdot \lambda^2} \quad (7)$$

where $D_{retro}$, represents the retro-modulator optical aperture, $A_{rec-Sat}$ represents the receiver aperture at the laser interrogator station, $\lambda$ represents the signal wavelength and $G_{net}$ represents the net gain of the amplified retro-modulator system. Note that the signal power returned from the amplified retro is exactly $G_{net}$ times the signal power returned from a conventional retro-modulator with the same aperture. That is, in our conservative example, one would obtain 460 times more power back from the amplified retro-modulator than the conventional modulator would provide. Commercially available EDFA systems with 40-dB small signal gains are available. Since the effective area of the AFRM is also $G_{net}$ times the area of a conventional MRR, it is therefore possible to increase the effective area of the retro-modulator by nearly 4 orders of magnitude (or equivalently increase the gain of the return power by about 2000 times or more). If the EDFA spontaneous emission noise, $P_{ASE}$, is much less than the amplified signal power collected by the input aperture of the retro-modulator, the link performance will not be degraded by the use of an amplifier. Therefore, the effect of the spontaneous emission noise on the receiver signal-to-noise ratio can be neglected.

In accordance with the communication and remote data monitoring system of the present invention, an example of link analysis for a Satellite-based laser interrogator and low-power Gbit/s amplified fiber retro-modulator is given below.

Figure 6:
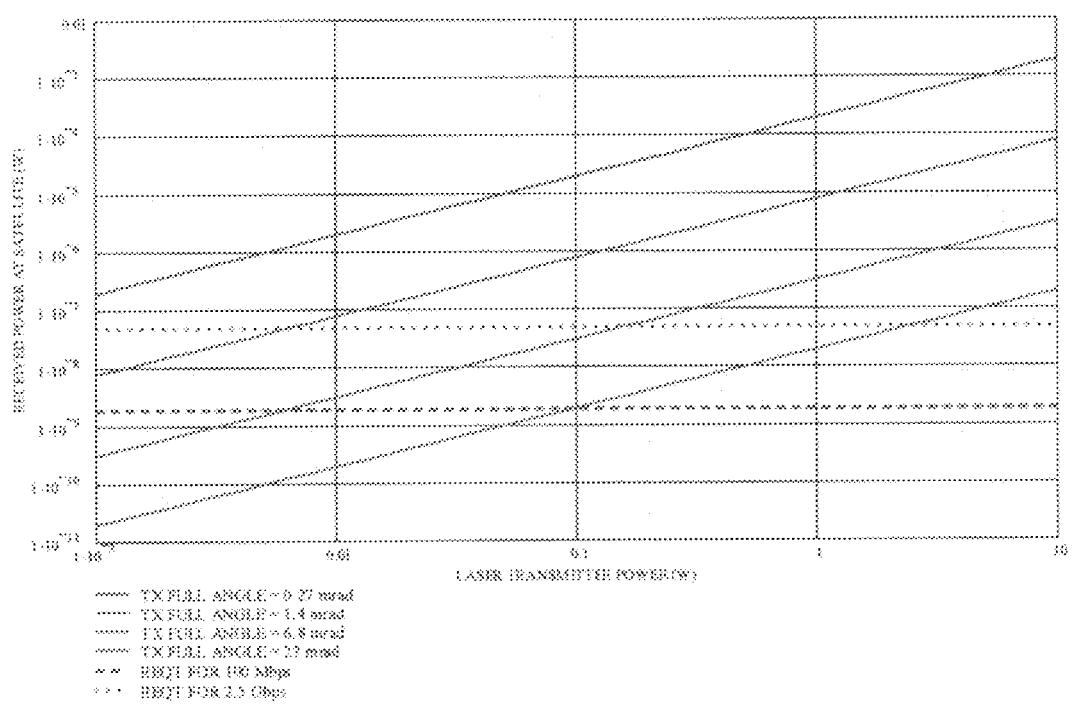
FIG. 6 is a plot of the received power versus laser transmitter power as an example of a satellite-based laser interrogator and a ground-based fiber "retro" system using the embodiment of the present invention shown in FIG. 1a and FIG. 1b.

FIG. 6 shows the simulation result for a satellite-based laser interrogator and ground-based amplified retro-modulator. The range of the satellite was assumed to be 370 km, the atmospheric transmission efficiency=0.5. The retro-reflected beam is received by the satellite receiver of 6 inch diameter. The transmitter efficiency was assumed to be 0.5, the bit-error-rate (BER)=$10^{-9}$, signal-to-noise-ratio (SNR)=144, and the gain of the retro-modulator system was taken to be $4 \times 10^5$.

The simulation result shows the received power at satellite as a function of required laser transmitter power on the satellite for different values of the divergent angles of the transmitter. The two horizontal dashed lines represent the needed received power at the satellite for 100 Mbit/s and 2.5 Gbit/s data rates. For example, to achieve a data rate of 2.5 Gbit/s, for a transmitter divergent beam of 6.8 mrad, it requires 160 mW of laser power whereas for transmitter divergent beam of 27 mrad, it requires about 2.5 W of laser power. All these numbers are very practical and realistic; thus the AFRM system can be built. This is an example of a realistic device. Note that the device based on this patent has not been reduced to practice.

The present invention illustrates that an AFRM can provide orders of magnitude increase in the link data rate and orders of magnitude decrease in the transmit power compared with the conventional MRR systems. While the present invention has been illustrated and described in detail in the drawings and foregoing descriptions, it will be recognized that modifications can occur to persons skilled in the art. It is therefore intended, by the append claims, to cover any such modifications as within the scope and spirit of the invention.

(i) Long-range capability (10 s to 100 s of Km), even in the presence of atmospheric turbulence. This is possible because the return signal is amplified to improve signal-to-noise ratio. A passive cornercube or any other existing conventional retromodulator would simply reflect the input signal without amplification, which will be often be too weak to provide reliable identification.

(ii) Extremely covert system that can almost never be used to the enemy's advantage. The proposed device provides an identifying output signal only for an extremely brief time, and only in the direction of an authorized interrogator. (For example, the typically slow response times for a shutter on a cornercube or for existing retromodulators would leave significant windows for possible enemy detection, during which time it could send a return in an unauthorized direction toward the enemy.)

(iii) Fast response, allowing high laser interrogator slew rates and high friendly asset speeds. The proposed device achieves this with high-speed optical switching. The slow response of a mechanical cornercube shutter or any other existing retromodulator could severely limit performance.

(iv) Capability for the friendly asset being interrogated to identify and precisely "locate" the direction of the interrogator.

(v) Capability for secure two-way communications between the interrogator and the friendly asset being interrogated. Communication data rates of 2.5 to 10 Gb/s are anticipated. This data rate is much higher than any existing retromodulator devices.

This method of returning the incident signal provides a novel means of determining also the exact angular location of the source.

These additional advantages will be achieved while also maintaining the advantages of cornercubes and other types of existing retromodulators:

(i) Wide input field-of-view (FOV), allowing a large angular range between the laser interrogator and the device's optical axis. The larger the FOV, the fewer devices needed to ensure that the interrogator will be within the FOV of at least one device. A FOV of >±30° is possible with an array of input and output lenses thus increasing the FOV of the individual free-space optics and single mode fiber coupler-based retromodulator proposed here.

(ii) Low divergence of the selected return beam (after locating the source), reducing the probability of enemy detection: Near-diffraction-limited divergence may be achieved.

(iii) Light weight.

(iv) Low power consumption (~125 mW needed to achieve ~10 Gb/s data rates).

(v) Low cost

Note again that the device based on this invention has not been reduced to practice.

The present inventions not limited by the exemplary embodiments described above, and it will be recognized and understood that the appended claims are intended to cover all modifications and equivalents which may fall within the spirit and scope the invention.

What is claimed is:

1. A system for remote communication and data monitoring, comprising: a base station and a remote station, said base station comprising transmitter-receiver means to transmit an interrogation optical beam to said remote station, and a receiver at said base station to detect the returned signal from the said remote station; said remote station comprising:

receiving optics including a wide-angle large format telecentric lens coupled to an input lenslet array, the input lenslet array further coupled to an array of single mode fibers that accept return light received from the interrogator, each single mode fiber of the array of single mode fibers including a single mode fiber tap and each single mode fiber tap coupled to a separate photodetector and electronics, whereby said electronics are used to identify the single mode fiber in said single mode fiber array that receives a return signal with the highest intensity, the single mode fiber array further coupled to an optical amplifier to amplify the return signal, and the amplifier further coupled to a return signal modulator;

transmit exit optics including a wide-angle telecentric lens to retro-reflect back to the interrogator location the amplified and modulated return signal exiting from a spatial router fiber element that corresponds to the input lenslet array element with the highest received signal, said transmitting exit optics co-aligned with the input lenslet array and coupled to an output array of single mode fibers so that there is a one-to-one correspondence between the direction of reception and transmission; and a spatial router control device including electronics to switch said single mode fiber spatial router to a specific single mode fiber of said output array of single mode fibers to retro-reflect the return signal back to the interrogator and further including a sensor that collects data with a data buffer to store said data.

2. The system of claim 1; wherein said telecentric lens comprises a wide-angled lens with a large format putting the far-field plane of the received signal at the input plane of the said input lenslet array making each lenslet in the array to correspond to a different input-beam angle, and thus different direction to the laser interrogator, and wherein said system provides a novel means of determining the exact angular location of the source.

3. The system of claim 1, wherein a two-dimensional lenslet array is used to obtain large field-of-view (FOV) to accept a wide-angle incident light.

4. The system of claim 1, wherein a second separate two-dimensional lenslet array is used to transmit the return signal at any wide-angle within the a field-of-view (FOV) of the remote station.

5. The system of claim 1, wherein said system comprises only one single low noise, low power-consuming optical amplifier for amplifying the optical signals at said receiving optics input lenslet array outputs.

6. The system of claim 1, wherein:
said system comprises only one single modulator for modulating the optically amplified signals; and
said data buffer provides the signals to modulate the amplified optical signal by the modulator.

7. The system of claim 2, further comprises a low outcoupling fiber tap combined with a slow-speed photodetector attached to each coupler to detect the input time-averaged powers in order to identify the particular input lenslet array element which receives the largest incident signal from the interrogator.

8. The system of claim 2 further comprising electronics which detect the single mode fiber of the single mode fiber array of said receiving optics receiving the highest intensity input signal and which electronically switch a single mode fiber spatial router (1×N) coupled thereto to the correct single mode fiber of said output array of single mode fibers of the transmitting exit optics for retro-reflection to the interrogator.

9. The system of claim 1, comprises a data buffer which receives data from a monitoring sensor, and could either output real-time data or data stored over some previous time interval.

* * * * *